Dec. 23, 1969   F. G. FREEMAN   3,485,270
ELECTRO-MAGNETIC FLUID FLOW CONTROL DEVICES
Filed May 22, 1967
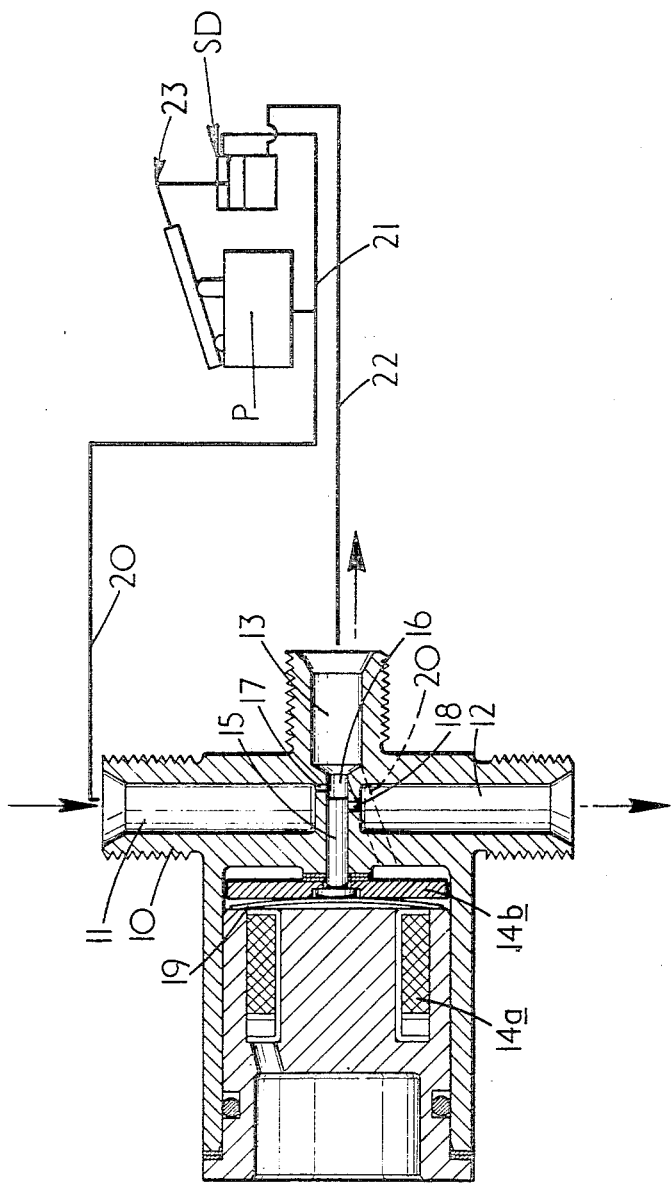

United States Patent Office 3,485,270
Patented Dec. 23, 1969

3,485,270
ELECTRO-MAGNETIC FLUID FLOW CONTROL DEVICES
Frank George Freeman, Solihull, England, assignor to Joseph Lucas (Industries) Limited, Birmingham, England, a British company
Filed May 22, 1967, Ser. No. 640,169
Claims priority, application Great Britain, May 20, 1966, 22,550/66
Int. Cl. F16k 11/07, 31/06, 39/00
U.S. Cl. 137—625.48       3 Claims

ABSTRACT OF THE DISCLOSURE

An electro-magnetic fluid flow control device including a member movable in a flow passage to control the fluid flow, an electro-magnetic device for controlling the movement of the member, the flow passage including a chamber into which open a pair of orifices associated with the inlet and outlet of the flow passage respectively, the two orifices being out of alignment whereby the force required to move the member which is located in the chamber is minimized.

This invention relates to electro-magnetic fluid flow control devices of the kind in which a member is positioned by an electro-magnetic device to control the flow of fluid through a passage (hereinafter simply called "control devices of the kind specified").

In a control device of the kind specified there is generally a passage formed in part by two substantially aligned orifices through one of which fluid is discharged, with the quantity of fluid received by the other being dependent upon the position of a member serving as an obturator between the orifices. With this control device, a substantial force is required to introduce the obturating member between the orifices to overcome the force due to the jet of fluid leaving the first orifice.

An object of the present invention is to provide a control device of the kind specified in which the movement of the member between the orifices is facilitated.

According to the present invention there is provided a fluid pressure control system comprising the combination of a source of pressurized fluid, a fluid actuated device for actuation by pressurized fluid from the source and a valve connected between the source and the fluid actuated device controlling the pressure at which fluid is supplied to the fluid actuated device, the valve including a body having a fluid inlet connected to the source, a fluid outlet, a further outlet disposed normal to the inlet and outlet operably connected to the fluid actuated device, a bore coaxial with and in communication with the further outlet, fluid flow restricting orifices providing communication between the bore and the inlet and outlet respectively, a member movable in the bore for controlling flow between the inlet and the outlet, the orifices being out of alignment with one another in the direction in which the member is movable, an electro-magnetic device in the body operably connected to the member and effecting control movement of the member in use, whereby movement of the member controls the escape of fluid from the bore through the orifice communicating with the outlet to vary the pressure in the bore, and means cooperable with the member serving to move the member to a position in which the orifice communicating with the outlet is closed.

An embodiment of the present invention will now be described, by way of example, with reference to the accompanying drawing in which the single figure is a cross-sectional view of a control device of the kind specified operatively associated with a swash-plate pump and servo device.

The control device of the kind specified comprises a body 10 having an inlet 11 and an outlet 12 for the fluid to be controlled. The fluid may be either liquid or gaseous. The body 10 has a further outlet 13 disposed normally to the inlet 11 and outlet 12 and in which the fluid pressure is at a value corresponding to the ratio of the pressures in the inlet 11 and outlet 12.

The body 10 also contains an electro-magnetic device 14a of which an armature 14b engages a headed plunger 15 slidably mounted in a bore 16 co-axial with the outlet 13. The inlet 11 communicates with the bore 16 through a small passage or orifice 17 and the outlet 12 communicates with the bore 16 through a larger passage or orifice 18. The orifices 17 and 18 are out of alignment with one another, and orifice 18 is nearer to the plunger head than is the orifice 17.

The armature 14b is backed by a plate spring 19 which urges the armature 14b and the plunger 15 towards a position in which the latter wholly closes access to the orifice 18.

A drilling 20 affords communication between the interior of the bore 16 and the space surrounding the armature 14b so that equal fluid pressures act at opposite ends respectively of the plunger 15 so that the latter is substantially balanced within the fluid system, and its movement is therefore substantially wholly controlled by the armature and the plate spring 19.

Since the whole of the interior of the body 10 is filled with fluid, the electro-magnetic device 14a is encapsulated in a suitable fluid-tight material.

In the present example, the above described control device is operatively associated with a swash-plate pump P subjected to the control of a servo device SD. The outlet of the pump P is connected to the inlet 11 of the control device by a pipeline 20 with a bleed-off via a pipeline 21 to one side of the servo device SD. The other side of the servo device SD is connected by a pipeline 22 to the outlet 13.

The swash plate of the pump P is mechanically connected to the servo device SD as indicated at 23.

In use, the pump P delivers fluid to the inlet 11 of the control device via pipeline 20 and to the servo device SD via pipeline 21 while a servo fluid pressure is delivered to the servo device SD via the pipeline 22. The value of the fluid pressure in the outlet 13, and consequently of the servo pressure, is determined by the position of the plunger 15 in its bore 16, and hence the quantity of fluid entering the bore 16 through the orifice 17 from the inlet 11 and escaping through the orifice 18 to the outlet 12. Since, the orifices 17 and 18 are out of alignment, the plunger 15 does not have to overcome the effect of a fluid jet passing between the two orifices 17 and 18, and thus relatively small changes in the electrical current supplied to the electro-magnetic device 14a can be used to control the pressure in the outlet 13.

Having thus described my invention what I claim as new and desire to secure by Letters Patent is:

1. A fluid pressure control system comprising the combination of a source of pressurized fluid, a fluid actuated device for actuation by pressurized fluid from said source and a valve connected between the source and the fluid actuated device controlling the pressure at which fluid is supplied to said fluid actuated device, said valve comprising a body having a fluid inlet connected to the source, a fluid outlet, a further oulet disposed normal to the inlet and outlet connected to the fluid actuated device, a bore coaxial with and in communication with said further outlet, a first fluid flow restricting orifice providing communication between said bore and said inlet, a second fluid flow restricting orifice providing communication between said bore and said outlet, said orifice communicating with the outlet being larger than the orifice communicating with the inlet, a member movable in said bore for controlling flow between the inlet and the outlet, the orifices being out of alignment with one another in the direction in which said member is movable, an electromagnetic device in the body connected to said member and effecting controlled movement of said member in use, whereby movement of said member controls the escape of fluid from the bore through the orifice communicating with the outlet to vary the pressure in said chamber and means cooperable with said member serving to urge said member to a position in which the orifice communicating with the outlet is closed.

2. The fluid pressure control system as claimed in claim 1 in which said member is a plunger slidable in said chamber and said electromagnetic device includes an armature to which said plunger is connected and said last named means being a spring acting on said plunger.

3. The fluid pressure control system as claimed in claim 2 in which the body is formed with a drilling between said bore and a space surrounding the armature whereby both ends of the plunger are subjected to the same fluid pressure.

References Cited

UNITED STATES PATENTS

| | | | |
|---|---|---|---|
| 1,772,879 | 8/1930 | Stearns | 251—129 |
| 3,247,912 | 4/1966 | Reynolds | 251—129 X |

FOREIGN PATENTS

| | | |
|---|---|---|
| 627,539 | 9/1961 | Canada. |
| 1,160,739 | 3/1958 | France. |

M. CAREY NELSON, Primary Examiner

MICHAEL O. STURM, Assistant Examiner

U.S. Cl. X.R.

251—129, 282